United States Patent
Ayres et al.

(10) Patent No.: US 8,300,021 B2
(45) Date of Patent: Oct. 30, 2012

(54) POSITION SENSING DISPLAY

(75) Inventors: John Richard Ayres, Reigate (GB); Martin John Edwards, Crawley (GB)

(73) Assignee: Chimei Innolux Corporation (TW)

( * ) Notice: Subject to any disclaimer, the term of this patent is extended or adjusted under 35 U.S.C. 154(b) by 746 days.

(21) Appl. No.: 12/340,346

(22) Filed: Dec. 19, 2008

(65) Prior Publication Data

US 2009/0179868 A1 Jul. 16, 2009

Related U.S. Application Data

(60) Provisional application No. 61/016,804, filed on Dec. 26, 2007.

(30) Foreign Application Priority Data

Jul. 23, 2008 (EP) ..................... 08160966

(51) Int. Cl.
*G06F 3/041* (2006.01)
(52) U.S. Cl. ............... 345/173; 345/50; 345/204
(58) Field of Classification Search .......... None
See application file for complete search history.

(56) References Cited

U.S. PATENT DOCUMENTS

| | | | |
|---|---|---|---|
| 5,466,892 A | 11/1995 | Howard et al. | |
| 2002/0093491 A1* | 7/2002 | Gillespie et al. | 345/173 |
| 2007/0222762 A1 | 9/2007 | Van Delden et al. | |
| 2007/0222766 A1 | 9/2007 | Bolender | |
| 2008/0062148 A1* | 3/2008 | Hotelling et al. | 345/174 |
| 2008/0142352 A1 | 6/2008 | Wright | |

FOREIGN PATENT DOCUMENTS

| | | |
|---|---|---|
| WO | 9618179 | 6/1996 |
| WO | 2005101178 | 10/2005 |
| WO | 2007146783 | 12/2007 |

OTHER PUBLICATIONS

European Search Report for EP Application No. 08160966.1.

* cited by examiner

*Primary Examiner* — Jason Olson
(74) *Attorney, Agent, or Firm* — Lowe Hauptman Ham & Berner, LLP

(57) ABSTRACT

A position sensing display integrates a touch sensor with an active matrix LCD panel. X sense electrodes and y sense electrodes in respective layers on a front panel are coupled capacitatively to respective sense circuits on active rear panel. A common electrode is driven, and the resulting signal on the x-sense electrodes and y sense electrodes is measured by the respective sense circuits. Changes in the resulting signal when sensed object approaches are measured to locate the sensed object.

9 Claims, 4 Drawing Sheets

POSITION SENSING DISPLAY

CROSS REFERENCE TO RELATED APPLICATIONS

This application claims priority of U.S. Patent Provisional Application No. 61/016,804, filed on Dec. 26, 2007, and claims the priority of European Patent Application No. EP 08160966.1, filed on Jul. 23, 2008, the entirety of which is incorporated by reference herein.

BACKGROUND OF THE INVENTION

1. Field of the Invention

The present invention relates to a position sensing display and a method of operation of such a display.

2. Description of the Related Art

Position sensors have been combined with displays in the form of a transparent position sensing overlay which is placed over the display to record touch or pen input. Such sensors may consist of arrays of electrodes which are connected to drive/sense circuits.

The sensors may be capacitance sensors with sets of electrodes connected to drive and/or sensing circuits. The location of an object such as a stylus or finger is then determined by measuring changes in the capacitances associated with the electrodes which are affected by the object in close vicinity.

BRIEF SUMMARY OF THE INVENTION

The invention provides an active matrix display, comprising: a front panel and a rear panel; wherein the front panel includes: a transparent substrate; a common electrode for cooperating with a rear active substrate for driving the liquid crystal; a plurality of first sense electrodes extending across the display; the rear panel includes: a substrate; and an array of display pixels arranged as rows and columns; a plurality of sense circuits coupled to the respective sense electrodes further comprising coupling capacitors capacitively coupling the sense electrodes to the respective sense circuits for coupling sense signals from the sense electrodes to the sense circuits.

The invention also provides a front transparent substrate for an active matrix liquid crystal display, for cooperating with a rear active substrate with sense circuits, the front transparent substrate comprising: a common electrode for cooperating with the rear active substrate for driving the liquid crystal; a plurality of first sense electrodes extending across the display in a first direction; and a plurality of second sense electrodes extending across the display in a second direction across the first sense electrodes; coupling electrodes connected to each of the first sense electrodes and second sense electrodes, the coupling electrodes extending beyond the common electrode to a coupling region for capacitively coupling to coupling electrodes on the rear active substrate for coupling capacitance sense signals from the sense electrodes to the sense circuits on the rear active substrate.

The invention also provides a rear active substrate for an active matrix liquid crystal display, for cooperating with a front transparent substrate with sense electrodes, the rear active substrate comprising: an active matrix array of pixels; a plurality of first sense circuits and second sense circuits; and a plurality of coupling electrodes connected to respective x-sense circuits and y-sense circuits for capacitively coupling with coupling electrodes on the front transparent substrate for coupling capacitance sense signals from the sense electrodes to the sense circuits on the rear active substrate.

The invention further provides a method of sensing the position of a sensed object with an active matrix liquid crystal display with a transparent front substrate with a common electrode, a plurality of row sense electrodes extending across the display in a first x direction, and a plurality of column sense electrodes extending across the display in a second y direction across the row sense electrodes and an active rear substrate with an array of display pixels and a plurality of row sense circuits and column sense circuits, the method comprising: driving the common electrode with a drive signal; capacitatively coupling the drive signal on the x sense electrodes and y sense electrodes to respective x sense circuits and y sense circuits and detecting the capacitatively coupled drive signal on the x sense circuits and y sense circuits; and detecting the changes in the detected drive signal on particular row sense circuits and column sense circuits caused by the presence of a sensed object adjacent to respective row sense electrodes and column sense electrodes to locate the sensed object.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

By integrating the sense circuits with the display the display is simplified compared with prior display modules which potentially reduces cost and improves yield. Further, by avoiding providing a separate touch panel the possibility of dust or other small particles being trapped between the separate touch panel and the display is avoided.

In addition, a separate touch panel can affect the optical performance of the display by introducing additional surfaces that may cause reflections, which problem is reduced by integrating the touch sensor.

The inventors have realized that by coupling the front and rear panels the sense circuits can be provided on the active rear panel and coupled to electrodes on the front panel. The use of capacitors to couple the circuits to the electrodes avoids the difficult manufacturing step of providing ohmic contacts.

Referring to FIGS. 1 to 4, an active matrix liquid crystal display has a front panel 2, a rear panel 4 and liquid crystal 6 between the front and rear panels.

Figure 1:
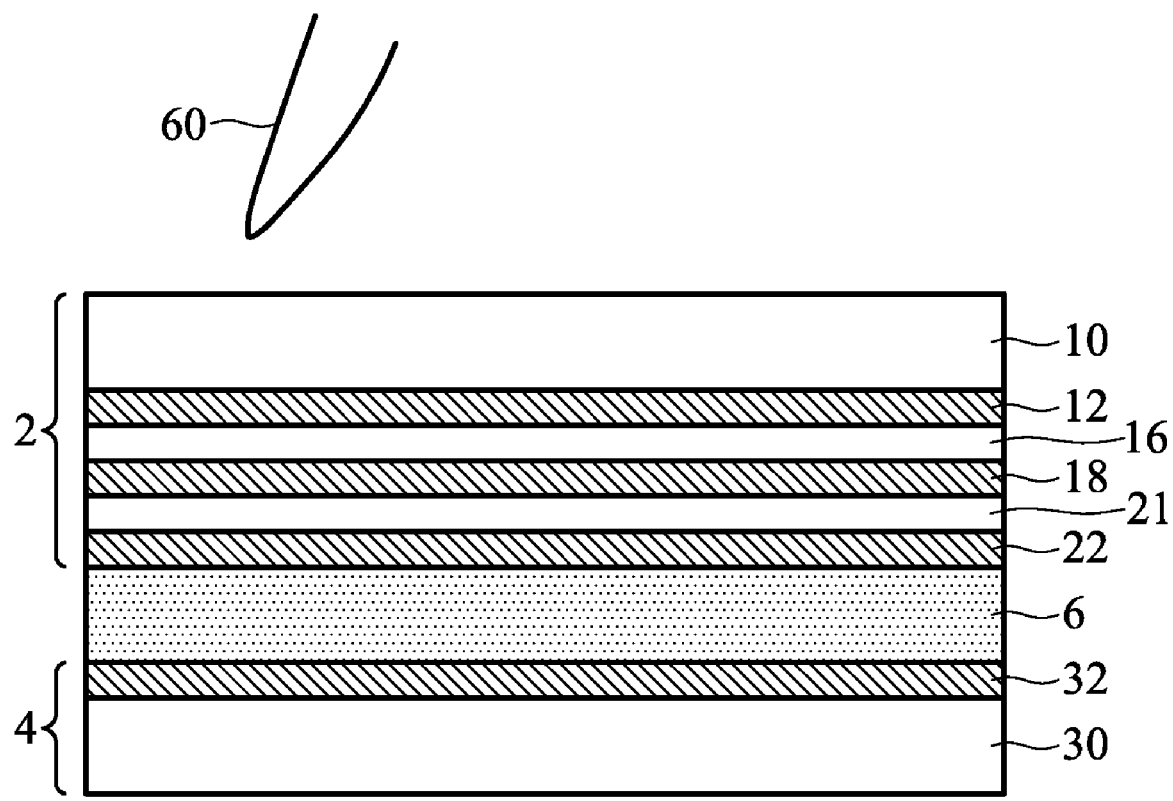
FIG. 1 shows a side view of an active matrix LCD according to an embodiment of the invention.
Figure 2:
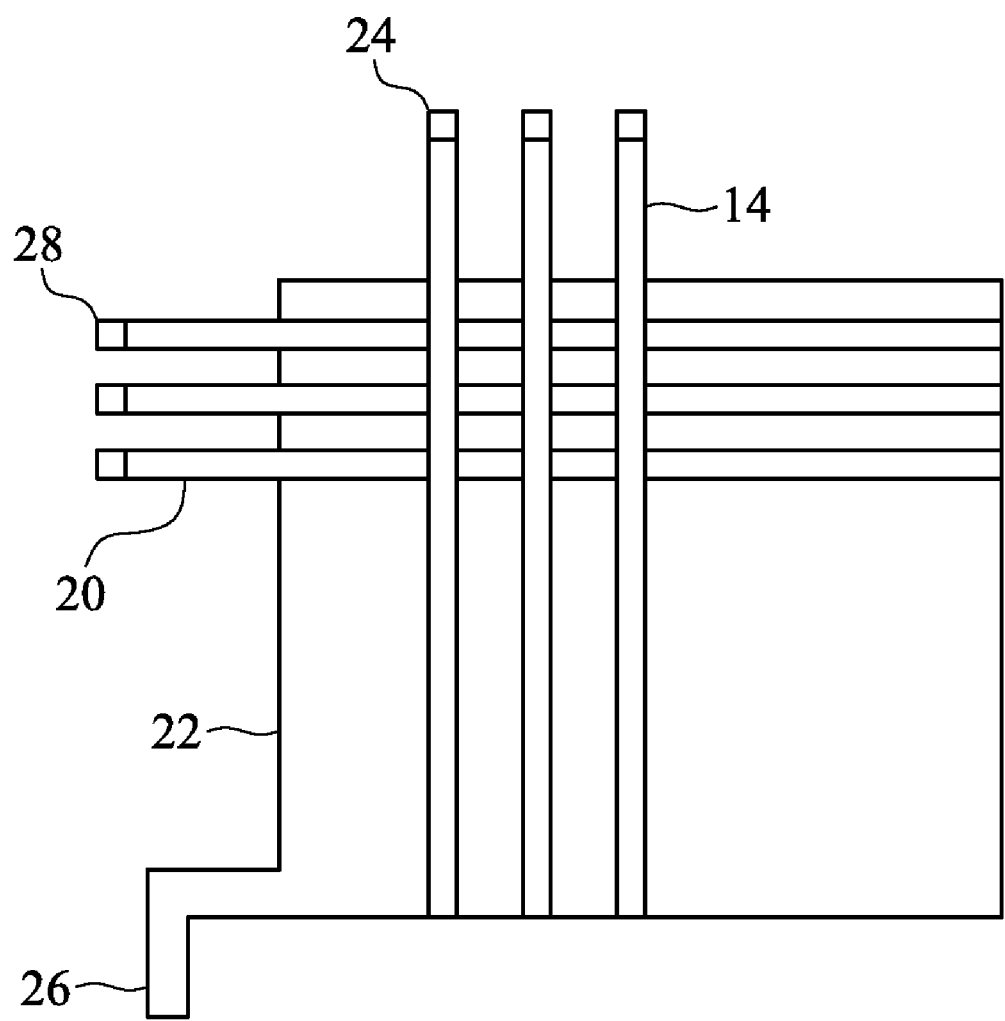
FIG. 2 shows the transparent front plate of the arrangement of FIG. 1.

Referring to FIGS. 1 and 2, note that FIG. 2 shows the front panel 2 viewed from the front. The front panel 2 has a transparent substrate 10 facing forward in the finished device, omitted from FIG. 2 for clarity. On the transparent substrate is an x-sense electrode layer 12 made up of a plurality of x-sense electrodes 14 extending in the column direction parallel to one another.

An insulating layer 16 covers the x-sense electrode layer 12. A y-sense electrode layer 18 is provided on the insulating layer, the y-sense electrodes extending in the row direction parallel to one another.

For clarity, only three x-sense electrodes 14 and y-sense electrodes 20 are shown in FIG. 2 but in reality there may be many more. For example, there may be tens or hundreds of electrodes depending on the resolution required.

A filter layer 21 is provided on the y-sense electrode layer, the filter layer including red, green and blue filters for providing a colour display.

A common electrode 22 is provided across the panel 2 on filter layer 21.

Each of the x-sense electrodes 14 includes a coupling region 24 which will be described further below. The y sense electrodes 20 include coupling regions 28. A contact region 26 for providing a direct contact to the common electrode 22 is also provided.

The electrodes 14, 20, 22 are conveniently transparent and may be made of transparent conducting material such as indium tin oxide. Likewise the substrate 10 is also transparent, and may be of glass or plastics for example.

Figure 3:
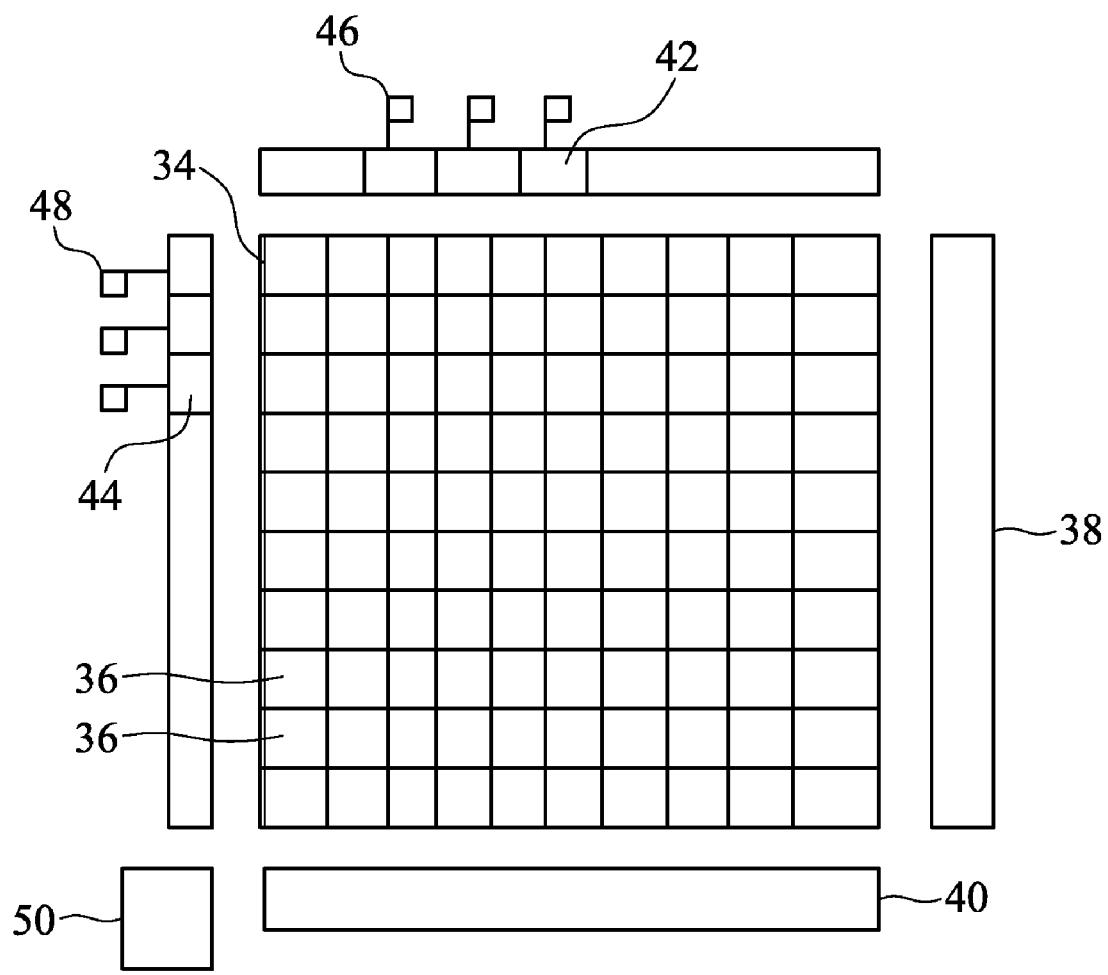
FIG. 3 shows the active rear plate of the arrangement of FIG. 1.

As for the rear panel, referring to FIGS. 1 and 3, this includes a rear substrate 30 and an active circuit layer 32 on the rear substrate. The active circuit layer 32 includes an active matrix pixel array 34 made up of a plurality of pixels 36 arranged in rows and columns. This may be any type of active matrix array as is well known in the art and so will not be described further.

Row drive circuit 38 is provided along one edge of the pixel array 34 to drive the rows of pixels and column drive circuit 40 is provided along an adjacent edge of the pixel array 34 to drive the columns. Any convenient drive circuit may be used.

X-sense circuits 42 are provided along the opposite edge of the pixel array 34 to the column drive circuit 40, arranged in a row. Each x-sense circuit 42 is connected to a respective coupling electrode 46 which is arranged in registration with a corresponding coupling region 24 of a respective x-sense electrode 14 on the passive substrate.

Similarly, y-sense circuits 44 are provided along the opposite edge of the pixel array 34 to the row drive circuit 38. Each y-sense circuit 44 is connected to a respective coupling electrode 48 which is arranged in registration with a corresponding coupling region 28 of a respective y-sense electrode.

A common electrode drive circuit 50 is arranged in direct (ohmic) contact with the contact region 26 to drive common electrode 22.

Note that the unlike the connection between common electrode drive circuit 50 and the contact region 26, the coupling regions 24,28 of the sense electrodes are not directly connected to the corresponding coupling electrodes 46, 48; instead they are capacitively coupled. In the embodiment, the liquid crystal acts as the dielectric though since the coupling regions and coupling electrodes are arranged outside the pixel array in other embodiments a solid dielectric support structure or spacer may act as the dielectric.

Figure 4:
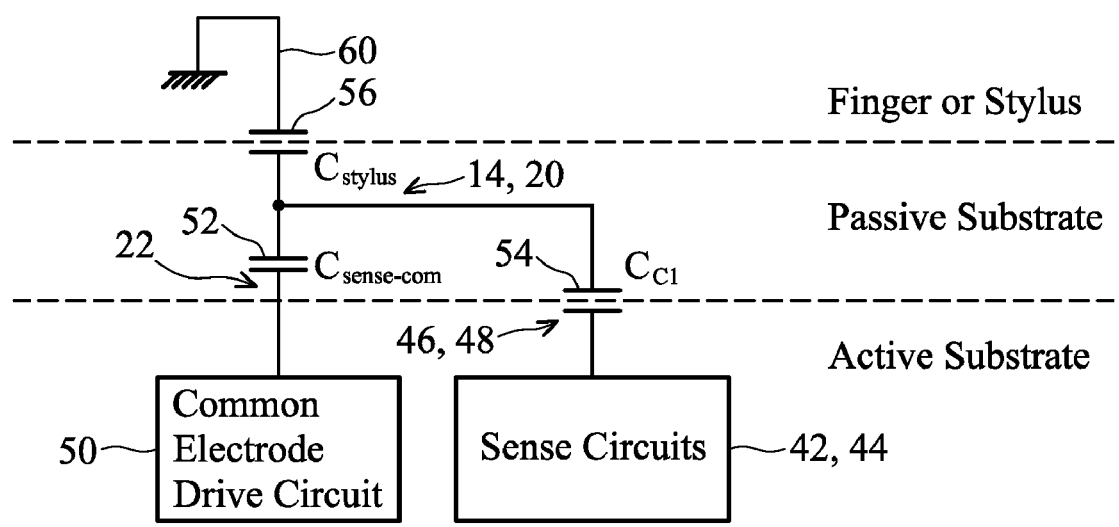
FIG. 4 is a circuit diagram showing the capacitative coupling between various components of the arrangement of FIG. 1.

This sets up a circuit as illustrated in FIG. 4 wherein the common electrode drive circuit 50 drives the common electrode 22 which is capacitatively coupled to sense electrodes 14, 20 by a sense-common coupling capacitance 52. The capacitance between coupling regions 24, 28 and coupling electrodes 46, 48 is represented schematically as coupling capacitor 54 between the sense electrodes 14, 20 and sense circuits 42, 44.

In use, the common electrode drive circuit 50 drives the common electrode 22 and this is coupled to the sense electrodes 14, 20 by the sense-common coupling capacitance 52. The signal on the sense electrodes 14, 20 is transmitted across coupling capacitor 54 to the sense circuits 42, 44.

When a stylus or finger 60 as sensed object is arranged near to the screen, this acts as an effective grounded capacitor coupled to the sense circuits 42, 44 through capacitor 56 which affects the signals detected on sense circuits 42, 44 and hence allows the position of the stylus or finger 60 to be determined by identifying which of the x-sense circuits 42 and y-sense circuits 44 have a change in the detected signal.

It will be appreciated that the common electrode 22 and pixel array 34 may be driven at the same time by drive circuits 38, 40, 50 to display an image or a sequence of images on the display.

The integration of sensing with an active matrix liquid crystal display enhances the ease of manufacture of a touch sensitive display. Further, the embodiment avoids the use of ohmic contacts, avoiding significant unreliability.

By coupling the sense electrodes 14, 20 to the sense circuits 42, 44 by capacitances formed between the active and passive substrate there is no need to provide a row of contacts to connect the sense circuits 42, 44 to the electrodes 14, 20 on the other substrate. Therefore, in this way all the active circuitry can be provided on the active rear panel 4 and the front panel 2 remains passive. The only direct contact in the embodiment described is that between the drive circuit 50 and contact region 26.

Although a specific embodiment has been described, this is by way of example only and those skilled in the art will realise that modifications can be made to the embodiment.

In particular, the invention may be used with active matrix organic light emitting diodes (AMOLED) devices.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An active matrix display, comprising:
a front panel and a rear panel;
wherein the front panel includes:
 a transparent substrate;
 a common electrode for cooperating with the rear panel for driving liquid crystal;
 a plurality of sense electrodes extending across the display, wherein the sense electrodes include first sense electrodes and second sense electrodes extending across the first sense electrodes and the first sense electrodes are x sense electrodes extending across the display in a column direction and the second sense electrodes are y sense electrodes extending across the display in a row direction;
the rear panel includes:
 a substrate; and
 an array of display pixels arranged as rows and columns;
 a plurality of sense circuits coupled to the respective sense electrodes; and
 coupling capacitors capacitively coupling the sense electrodes to the respective sense circuits for coupling sense signals from the sense electrodes to the sense circuits, wherein the coupling capacitors comprise:
respective coupling electrodes connected to each of the sense electrodes on the front panel, the coupling electrodes extending beyond the common electrode to a coupling region; and
respective coupling electrodes connected to each of the sense circuits on the rear panel aligned with respective coupling electrodes on the front panel, and the respective coupling electrodes and the coupling region are arranged outside the array of display pixels, and for the coupling capacitors, the liquid crystal acts as a dielectric.

2. The active matrix display according to claim 1, wherein the front transparent substrate comprises: a first sense electrode layer with one of the first sense electrodes and second sense electrodes and corresponding coupling electrodes on the front transparent substrate; an insulating layer on the first sense electrode layer; a second sense electrode layer with the other of the first sense electrodes and second sense electrodes and corresponding coupling electrodes on the insulating layer; a filter layer including colour filters on the second sense electrode layer; and a common electrode layer including the common electrode facing liquid crystal on the filter layer.

3. The active matrix display according to claim 2, wherein the sense circuits include first sense circuits and second sense circuits, wherein the first sense circuits are arranged along one edge of the array of display pixels and the second sense circuits are arranged along a perpendicular edge of the array of display pixels.

4. The active matrix display according to claim 3, wherein the rear panel further comprises a row drive circuit arranged on the opposite edge of the array of display pixels to the second sense circuits and a column drive circuit arranged on the opposite edge of the array of display pixels to the first sense circuits.

5. The active matrix display according to claim 1, wherein the front panel for cooperating with the rear panel with sense circuits, comprises: a common electrode for cooperating with the rear panel for driving the liquid crystal; a plurality of first sense electrodes extending across the display in a first direction; and a plurality of second sense electrodes extending across the display in a second direction across the first sense electrodes; coupling electrodes connected to each of the first sense electrodes and second sense electrodes, the coupling electrodes extending beyond the common electrode to a coupling region for capacitively coupling to coupling electrodes on the rear panel for coupling capacitance sense signals from the sense electrodes to the sense circuits on the rear panel.

6. The active matrix display according to claim 5, wherein the front panel has: a first sense electrode layer with one of the first sense electrodes and second sense electrodes and corresponding coupling electrodes on the front panel; an insulating layer on the first sense electrode layer; a second sense electrode layer with the other of the first sense electrodes and second sense electrodes and corresponding coupling electrodes on the insulating layer; a filter layer including colour filters on the second sense electrode layer; and a common electrode layer including the common electrode facing the liquid crystal.

7. The active matrix display according to claim 1, wherein the rear panel for cooperating with the front panel with sense electrodes, comprises: an active matrix array of pixels; a plurality of first sense circuits and second sense circuits; and a plurality of coupling electrodes connected to respective x-sense circuits and y-sense circuits for capacitively coupling with coupling electrodes on the front panel for coupling capacitance sense signals from the sense electrodes to the sense circuits on the rear panel.

8. A method of sensing the position of a sensed object with an active matrix liquid crystal display with a transparent front substrate with a common electrode, a plurality of first sense electrodes extending across the display in a first x direction, and a plurality of second sense electrodes extending across the display in a second y direction across the row sense electrodes and an active rear substrate with an array of display pixels and a plurality of row sense circuits and column sense circuits, coupling capacitors capacitively coupling the sense electrodes to the respective sense circuits for coupling sense signals from the sense electrodes to the sense circuits,
wherein the coupling capacitors comprise:
respective coupling electrodes connected to each of the sense electrodes on the front panel, the coupling electrodes extending beyond the common electrode to a coupling region; and
respective coupling electrodes connected to each of the sense circuits on the rear panel aligned with respective coupling electrodes on the front panel, and the respective coupling electrodes and the coupling region are arranged outside the array of display pixels, and for the coupling capacitors, the liquid crystal acts as a dielectric, the method comprising:
driving the common electrode with a drive signal; capacitatively coupling the drive signal on the first sense electrodes and second sense electrodes to respective row sense circuits and column sense circuits; and
detecting the capacitatively coupled drive signal on the row sense circuits and column sense circuits; and detecting the changes in the detected drive signal on particular row sense circuits and column sense circuits caused by the presence of a sensed object adjacent to respective row sense electrodes and column sense electrodes to locate the sensed object.

9. The method according to claim 8 further comprising driving the pixels with pixel drive signals to cooperate with the drive signal driving the common electrode to display an image on the display.

* * * * *